United States Patent [19]

Schantzen

[11] Patent Number: 5,474,156
[45] Date of Patent: Dec. 12, 1995

[54] MODULE CONNECTION ALIGNMENT SYSTEM

[75] Inventor: Wayne G. Schantzen, Thief River Falls, Minn.

[73] Assignee: Arctco, Inc., Thief River Falls, Minn.

[21] Appl. No.: 269,653

[22] Filed: Jul. 1, 1994

[51] Int. Cl.⁶ .................................................. F16D 55/00
[52] U.S. Cl. ..................... 188/71.1; 188/73.34; 403/390; 403/122
[58] Field of Search ................. 188/71.1, 73.31, 188/73.32, 73.34, 24.19, 370; 403/390, 391, 389, 131, 122; 411/337; 29/281.5; 180/190

[56] References Cited

U.S. PATENT DOCUMENTS

| | | | |
|---|---|---|---|
| 1,464,815 | 8/1923 | Gehrig | 403/131 |
| 4,140,413 | 2/1979 | Conrad | 403/131 X |
| 4,621,175 | 11/1986 | Volkmar | 403/131 X |
| 4,662,772 | 5/1987 | Schultz | 403/131 X |
| 5,092,703 | 3/1992 | Kobayashi | 403/122 |
| 5,320,199 | 6/1994 | Min | 188/24.19 |

OTHER PUBLICATIONS

Arctco "1992 Arctic Cat Snowmobile Illustrated Parts Manual Wildcat" Printed Nov. 1991 p. 6.
Arctco "1992 Arctic Cat Snowmobile Wildcat 700 Operator's Manual" Printed Aug. 1991 p. 27.

Primary Examiner—Robert J. Oberleitner
Assistant Examiner—Lee W. Young

[57] ABSTRACT

An alignment ball which is disposed within a channel of a vehicle part such as a brake caliper. The vehicle part is connected to a rigid vehicle support such as a chaincase by means of a fastening member such as a nut and bolt. The alignment ball is connected to the fastening member for properly aligning the brake caliper with the rigid vehicle support.

5 Claims, 5 Drawing Sheets

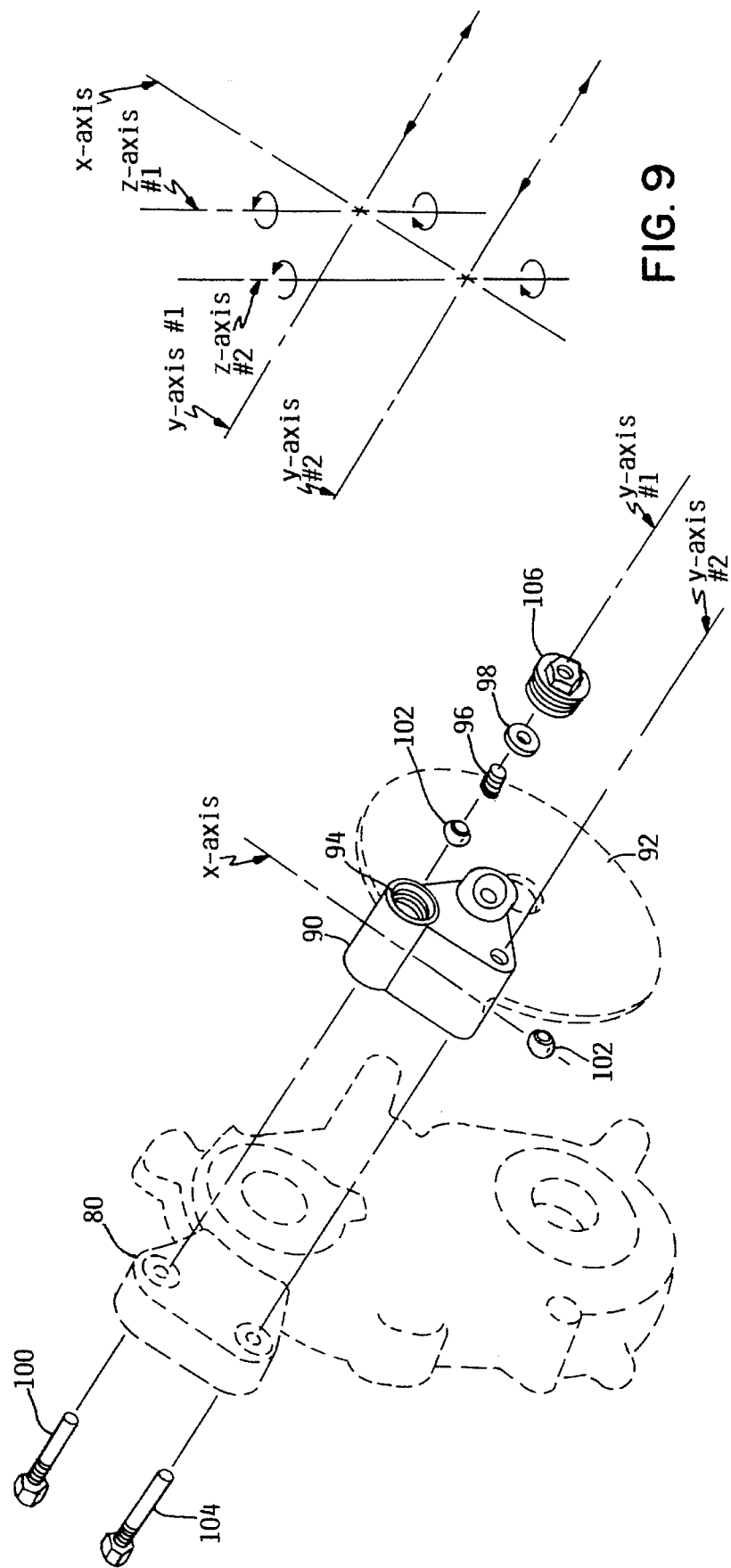

MODULE CONNECTION ALIGNMENT SYSTEM

BACKGROUND

The present invention relates to a vehicle part fastening system which is capable of alignment with an askew support.

Numerous devices have parts rigidly fastened to other parts in a variety of ways such as nuts and bolts. In many devices and vehicles some parts must be perfectly aligned with another part. For example, on some currently used snowmobiles, a brake caliper housing which is rigidly fastened by bolts to a chaincase should be perfectly aligned over a brake disk. If the chaincase is fixed in a slightly nonparallel position relative to the brake disk, then a problem of misalignment over the brake disk may exist and require adjustment.

Specifically, on some current snowmobile brake caliper models the following means for supporting and securing the brake caliper over the brake disk exists as follows. A brake caliper housing is positioned over part of the brake disk and has a plurality of apertures for accommodating mounting bolts. A brake caliper housing is supported by two bolts. The bolts extend through the brake caliper mounting bolt apertures and through to the chain case, where they are fastened with nuts. The size and shape of the brake caliper mounting bolt apertures are substantially the same as those of the bolt body.

Perpendicular to the brake caliper apertures and bolt are two brake pads on either side of the brake disk within the brake caliper housing. Sometimes the chain case is not completely parallel with the brake disk for a variety of reasons. Consequently, the brake pads within the brake caliper housing are not perfectly aligned parallel with the brake disk. When the brake is activated and the pads are pressed against the brake disk, the misaligned brake pads will have only a portion of brake pad retarding the brake disk. Disadvantages with a misaligned brake pad include the premature wearing away of only a portion of the brake pad and a loss of surface friction for braking.

Presently in some snowmobiles, to determine whether brake pads are properly aligned, parallel to the brake disk, and if not, to determine the necessary angle and degree of brake caliper assembly adjustment may involve the following steps.

First, open and secure the hood. Next, loosen the brake cable flange nut and disconnect the brake cable from the brake cable mounting bracket. Then, remove the brake return spring. Disconnect the brake cable at the brake caliper assembly. Remove the two nuts and bolts holding the brake caliper mounting bracket to the chaincase. Remove the brake caliper mounting bracket and two spacers. Next, remove the two bolts securing the brake caliper mounting bracket to the brake caliper assembly. Then, separate the brake caliper assembly and remove the four spacers. Remove the movable brake pad and metal plate from the brake caliper assembly. Normally, one does not remove the stationary brake pad from the caliper half unless the brake pad requires replacement. Remove the pad spring from the caliper. Finally, twist the actuator lever and remove it from the brake caliper assembly.

What is needed is a means for simplifying the above procedures to make certain that brake pads are properly and automatically aligned, parallel to the brake disk.

Accordingly, it is the object of the present invention to provide a module alignment system that overcomes the disadvantages of currently used braking systems.

SUMMARY

The present invention provides an apparatus and method for an automatic alignment ellipsoid system which overcomes the problems and satisfies the needs previously considered. It is an advantage of this invention to provide an apparatus and method for automatically aligning a mechanical brake system.

It is a feature of this invention to have an apparatus for aligning a mechanical brake system comprising a substantially rigid vehicle support; fastening members connected to the vehicle support; a vehicle part fitted over the fastening members, the vehicle part defining channels for retaining the fastening members with the vehicle part; alignment ellipsoids having a hole extending through a center of each; each alignment ellipsoid substantially disposed within a channel of the vehicle part, each fastening member passing through its alignment ellipsoid for aligning the vehicle part.

The vehicle part further defines predetermined gaps between the fastening members and the channels for providing sufficient fastening member movement inside the vehicle part to align the vehicle part.

More particularly, the apparatus may further comprise a compression spring axially disposed within at least one of said channels and adjacent to said alignment ellipsoid; a flat washer disposed within said channel adjacent to said compression spring and of sufficient size and shape to compress said compression spring against said alignment ellipsoid; a brake caliper nut threadably connected to said vehicle part within said channel and disposed adjacent to said washer; said brake caliper nut defining a channel for passage of the fastening member; said brake caliper nut further defining a predetermined gap between the fastening member and the channel through the brake caliper nut, for providing sufficient fastening member movement inside the vehicle part to align the vehicle part.

A method of using a device for simultaneously connecting and aligning a vehicle part, includes the steps of: providing a substantially rigid vehicle support; connecting two fastening members to the vehicle support; fitting a vehicle part over the fastening members, the vehicle part defining channels for retaining the fastening members disposed within the vehicle part; fitting an alignment ellipsoid over each fastening member, each alignment ellipsoid being substantially disposed within the channel of the vehicle part for aligning the vehicle part.

The method may further include the steps of fitting a compression spring over a fastening member and adjacent to the alignment ellipsoid; placing a flat washer against the compression spring; fitting a brake caliper nut over the fastening member, and tightening the brake caliper nut over the flat washer so as to compress the compression spring against the alignment ellipsoid for aligning the vehicle part.

Other objects and advantages of the present invention will be apparent and understood from the following detailed description when taken in conjunction with the accompanying drawings.

BRIEF DESCRIPTION OF THE DRAWINGS

A module alignment system constructed in accordance with this invention is described herein below with reference to the accompanying drawings, wherein;

FIG. 8 is an exploded perspective drawing of the assembled alignment system.

FIG. 9 is a perspective drawing of the axes of rotation of the assembled alignment system.

DETAILED DESCRIPTION OF THE INVENTION

To assist with proper orientation when viewing the drawings, "front" as used in this detailed description and the brief description of the drawings, refers to the front of the vehicle. The front side of any component is the end closest to the front of the vehicle. The "left side" and "right side" of a part refers to the position of the part as viewed by a rider sitting in the vehicle and facing forward.

Figure 1:
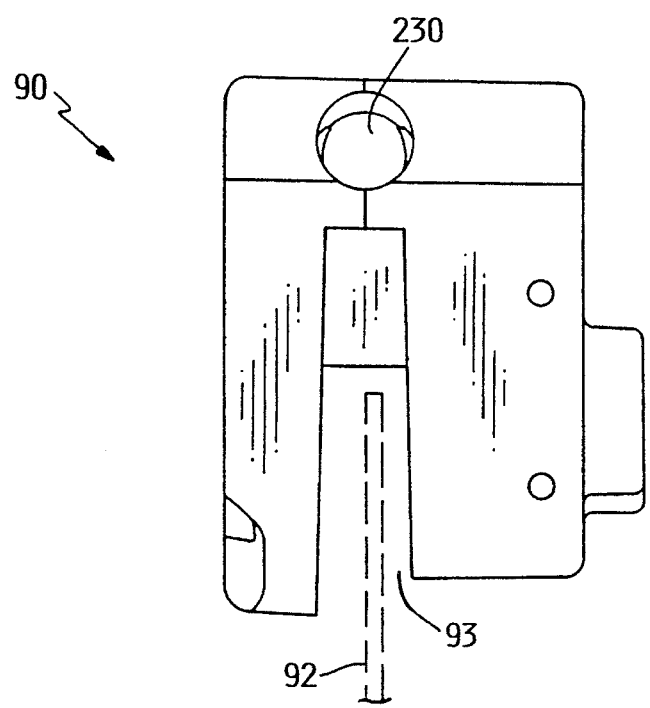
FIG. 1 is a front side perspective view of a caliper housing.

Referring now to the drawings, wherein like reference numerals designate like or corresponding parts throughout the several views, FIG. 1 illustrates a preferred embodiment, wherein the "vehicle part" of the invention is a brake caliper housing.

BRAKE CALIPER

FIG. 1 shows a front side perspective view of the brake caliper housing 90. A brake disk 92 (shown in dashed lines) partially extends into a brake disk slot 93 of the brake caliper housing 90.

Figure 2:
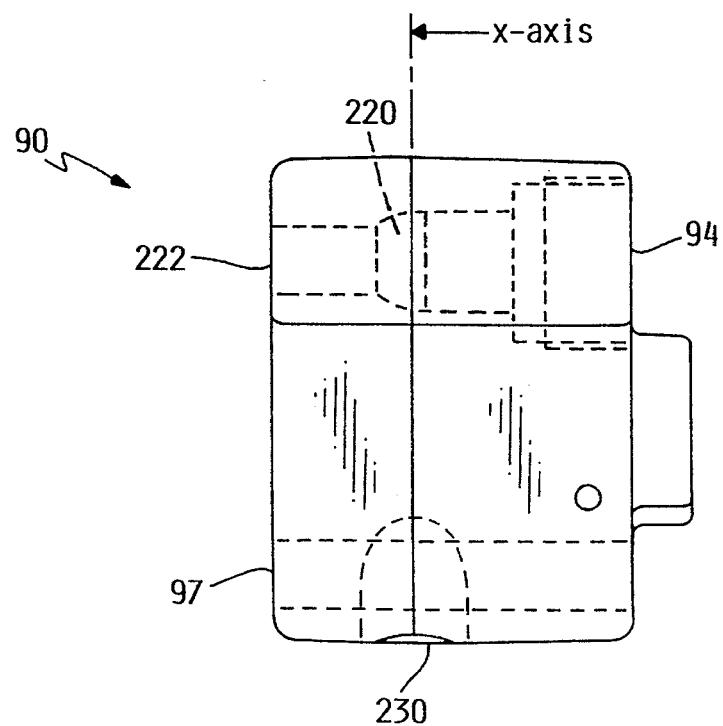
FIG. 2 is a top plan view of a caliper housing.

FIG. 2 is a top view of the brake caliper housing 90 which shows, in dotted lines, the internal channels and apertures. It also depicts the x-axis of rotation of the brake caliper housing.

Figure 3:
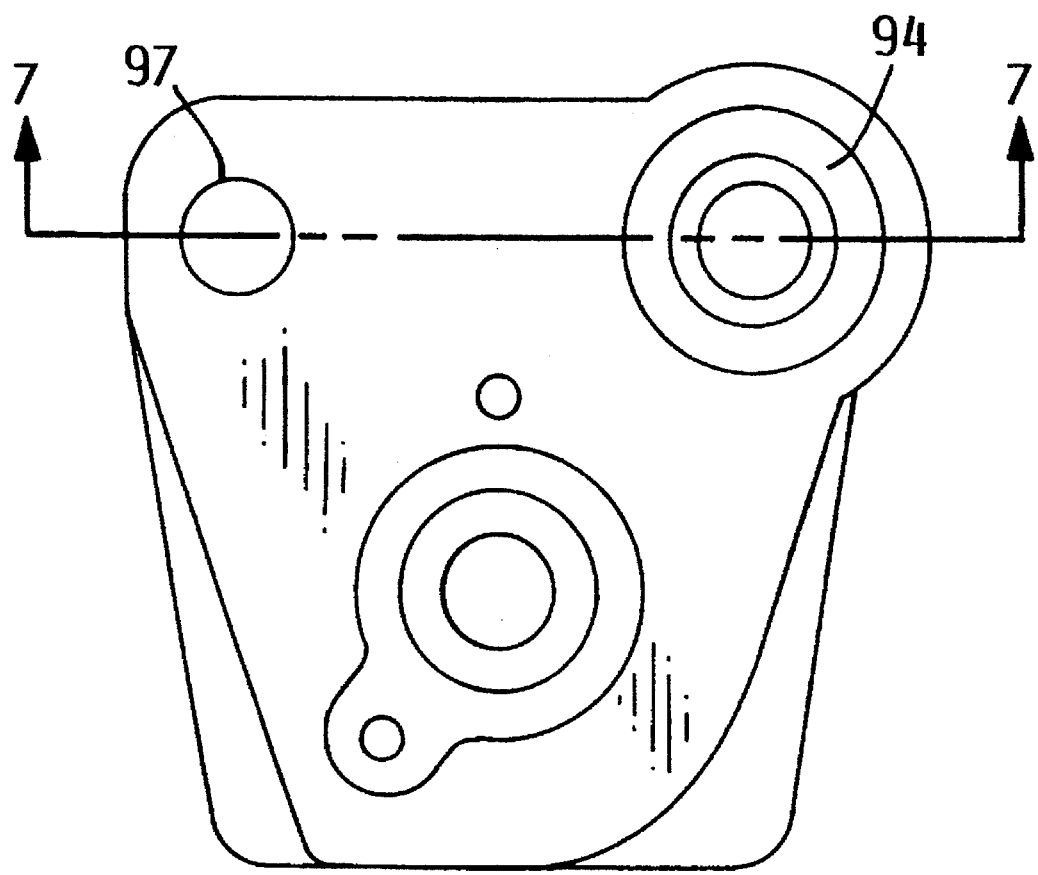
FIG. 3 is a left side elevational view of a caliper housing.

FIG. 3 is a left side elevational view of the brake caliper housing 90 which contains numerous apertures. The brake caliper nut aperture 94 is threaded for receiving the brake caliper nut 106. The chaincase mounting bolt aperture 97 is for a chaincase mounting bolt 104.

Figure 7:
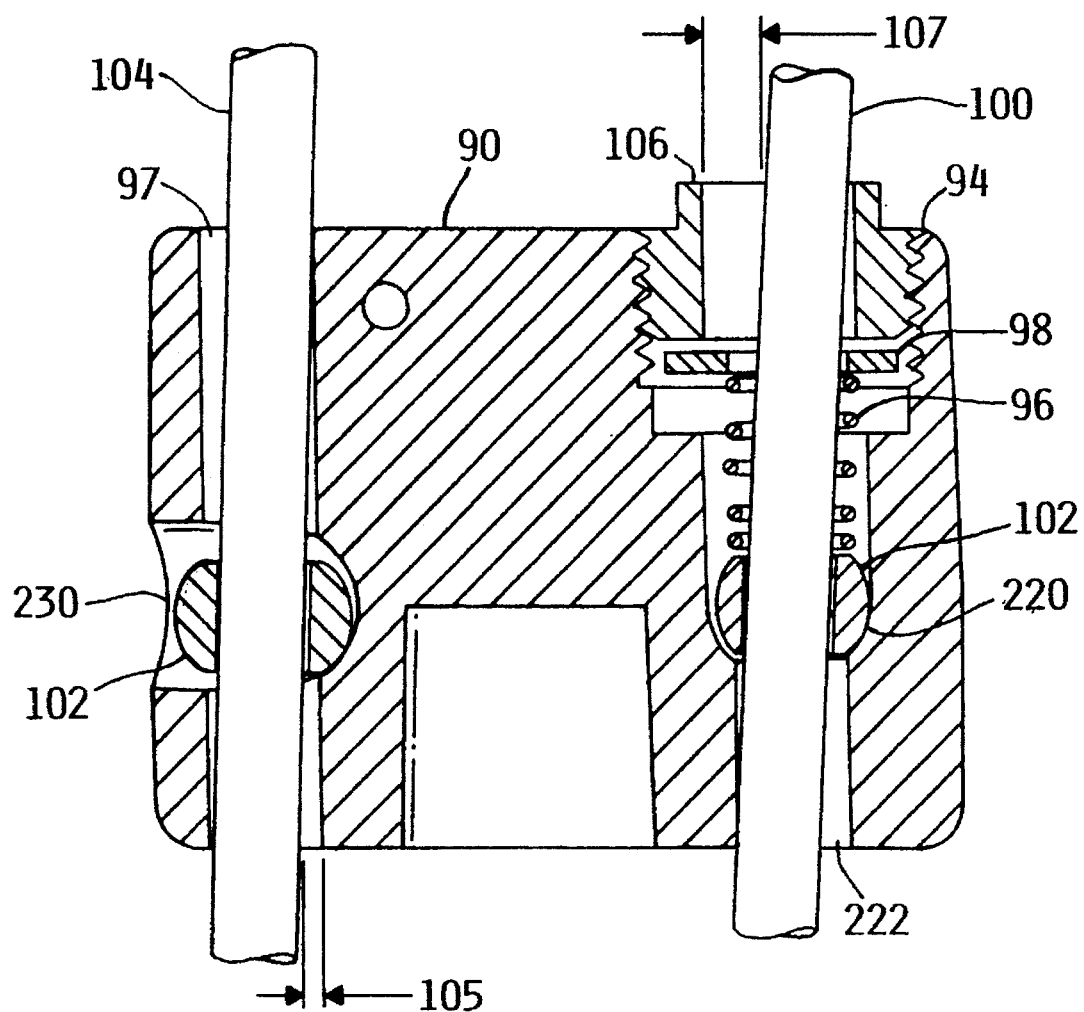
FIG. 7 exaggerates for illustration one example of bolt rotation by showing abnormally extended spring mounting bolt and chaincase mounting bolt within a section of the caliper housing taken on the line 7—7 of FIG. 3 looking in the direction of the arrows; it illustrates the predetermined gap which allows the bolt rotation.

Inserted within the brake caliper nut aperture 94 is a spring mounting bolt 100, a compression spring 96, a flat washer 98, and a brake caliper nut 106. FIG. 7 depicts the predetermined gaps 105 which allow proper alignment of the brake caliper housing 90. FIG. 8 depicts the chaincase 80 to which the mounting bolts 100 and 104 are attached.

ALIGNMENT BALL SYSTEM

Figure 4:
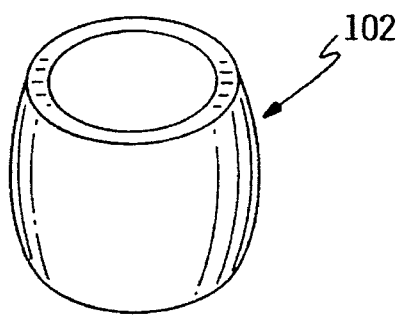
FIG. 4 is a perspective view of an alignment ellipsoid.
Figure 5:
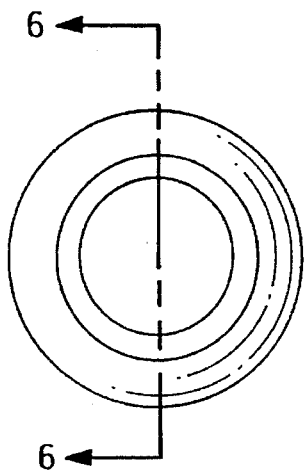
FIG. 5 shows a side elevational view of the alignment ellipsoid.
Figure 6:
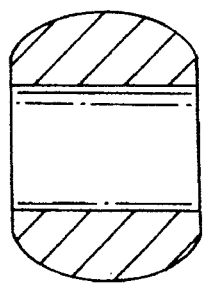
FIG. 6 shows a section of the alignment ellipsoid taken on the line 6—6 of FIG. 5 looking in the direction of the arrows.

FIGS. 4, 5, and 6 show the alignment ellipsoid as an alignment ball 102 in a preferred embodiment. FIG. 4 shows a side perspective view of the alignment ball 102. The shape of the alignment ball 102 is predominantly spherical with two sides of the sphere cut away by parallel planes. The interior of the alignment ball 102 is a hollowed out cylinder for accommodating a mounting bolt. Metal is a commonly used material for the alignment ball 102.

A second alignment ball 102 is seated within the spring mounting bolt alignment ball aperture 220. The alignment ball 102 is adjacent to a compression spring 96 which presses against a flat washer 98. The spring mounting bolt 100, which has a diameter smaller than that of the spring mounting bolt aperture 222 by the amount of the predetermined gap 105, is inserted through an alignment ball 102, the compression spring 96, the flat washer 98, and the brake caliper nut 106. The brake caliper nut 106 defines a channel which is larger than the spring mounting bolt 100 to create a predetermined gap 107, and is tightened so as to put compression spring force on the alignment ellipsoid.

Referring to revised FIG. 7, an alignment ball 102 is seated within the chaincase mounting bolt alignment ball aperture 230. The purpose of the alignment ball 102 with the chaincase mounting bolt 104 is to permit a degree of rotation of the chaincase mounting bolt 104 within the chaincase mounting bolt aperture 97, utilizing the predetermined gap 105 between the chaincase mounting bolt aperture 97 and the chaincase mounting bolt 104 to permit alignment of the caliper housing. The benefit derived from a chaincase mounting bolt alignment ball is that the brake caliper housing 90 freely moves in three directions so that the brake disk slot 93 is properly and automatically aligned with the brake disk 92.

A benefit derived from the alignment ball 102 on the spring mounting bolt is that it permits the spring mounting bolt 100 to be rotated. That rotation permits the brake caliper housing 90 to freely move into proper alignment so that the brake disk slot 93 is always in proper alignment with the brake disk 92.

The operation of the automatic module alignment system is as follows. The method of using a device for simultaneously connecting and automatically aligning a vehicle part includes the steps of connecting fastening members to a rigid vehicle support. A vehicle part fits over the fastening members where the vehicle part defines channels for retaining the fastening members disposed within the vehicle part and where said channels define predetermined gaps between the vehicle part and the fastening members. An alignment ball is fitted over each fastening member, the alignment ball being substantially disposed within each channel of the vehicle part for aligning the vehicle part.

One embodiment of the invention is the method of aligning a brake caliper housing with a brake disk relative to a rigid chaincase.

The method may further include the steps of fitting a compression spring over at least one fastening member and adjacent to the alignment ellipsoid; fitting a flat washer over the fastening member and against the compression spring; fitting a brake caliper nut over the fastening member and threadably connecting said brake caliper nut to said channel, said brake caliper nut having an internal channel for passage of the fastening member and defining a predetermined gap between said internal channel and the fastening member for aligning the vehicle part; tightening the brake caliper nut so as to put compression spring force on the alignment ellipsoid; with said channel then retaining the fastening member, the alignment ball, the compression spring, the flat washer, and the brake caliper nut.

Numerous characteristics and advantages of the invention covered by this document have been set forth in the foregoing description. It will be understood that other forms of the automatic module alignment system are contemplated by the present invention and that numerous modifications may be made by those with skill in the art without departing from the spirit and scope of the invention defined by the appendant claims.

I claim:

1. An apparatus for simultaneously connecting and aligning a vehicle part, comprising:

a) a fastening member connected to a substantially rigid vehicle support;

b) the vehicle part fitted over the fastening member, the vehicle part defining a channel for retaining the fastening member with the vehicle part;

c) an alignment ellipsoid having a hole extending through a center thereof;

e) said alignment ellipsoid substantially disposed within the channel of the vehicle part, the fastening member passing through the alignment ellipsoid for aligning the vehicle part;

f) the vehicle part fitted onto a second fastening member, the vehicle part defining a second channel for retaining the second fastening member with the vehicle part;

g) a second alignment ellipsoid having a hole extending through a center thereof;

h) said second alignment ellipsoid substantially disposed within the second channel of the vehicle part, the second fastening member passing through the second alignment ellipsoid for aligning the vehicle part; and i) the vehicle part defining predetermined gaps between the fastening members and the channels for providing sufficient fastening member movement inside the vehicle part to align the vehicle part.

2. An apparatus as recited in claim 1 and further comprising:

a) a compression spring disposed adjacent to one of said ellipsoids and being fitted over one of the fastening members;

b) a washer disposed adjacent to the compression spring and being fitted over the fastening member;

c) a brake caliper nut threadably connected to the channel associated with the one fastening member disposed adjacent to the washer, being fitted over the one fastening member, and being substantially disposed within the vehicle part;

d) the brake caliper nut defining a predetermined gap between the one fastening member and the brake caliper nut for providing sufficient fastening member movement inside the vehicle part to align the vehicle part; and e) the brake caliper nut being tightened so as to put compression spring force on the one alignment ellipsoid.

3. Apparatus in accordance with claim 2, wherein the vehicle part is in a snowmobile.

4. A method of using a device for simultaneously connecting and aligning a vehicle part, comprising the steps of:

a) connecting a first fastening member to a substantially rigid vehicle support;

b) fitting an alignment ellipsoid having a hole extending through the center thereof into a first channel of the vehicle part, the first alignment ellipsoid being substantially disposed within the first channel of the vehicle part;

c) fitting the first channel with the first alignment ellipsoid onto the first fastening member such that a predetermined gap is defined between the first channel and the first fastening member to allow the vehicle part to be aligned;

d) connecting a second fastening member to the vehicle support;

e) fitting a second channel of the vehicle part onto the second fastening member such that a predetermined gap is defined between the second channel and the second fastening member; and f) fitting a second alignment ellipsoid having a hole extending through the center thereof over the second fastening member, the second alignment ellipsoid being substantially disposed within the second channel of the vehicle part for aligning the vehicle part.

5. The method of claim 4, further comprising the steps of a) fitting a compression spring over one of the fastening members and placing it adjacent to the ellipsoid associated with the one fastening member;

b) fitting a flat washer over the one fastening member and placing it adjacent to the compression spring;

c) selecting a brake caliper nut which defines a channel for passage of the one fastening member and which channel defines a predetermined gap between that channel and the fastening member for providing sufficient movement inside the vehicle part to align the vehicle part;

d) fitting said brake caliper nut over the one fastening member and adjacent to the flat washer and then threadably connecting said brake caliper nut to the one channel of the vehicle part; and e) tightening the brake caliper nut so as to put compression spring force on the associated alignment ellipsoid.

* * * * *

UNITED STATES PATENT AND TRADEMARK OFFICE
CERTIFICATE OF CORRECTION

PATENT NO. : 5,474,156
DATED      : December 12, 1995
INVENTOR(S) : Wayne G. Schantzen It is certified that error appears in the above-indentified patent and that said Letters Patent is hereby corrected as shown below:

Column 4, line 17, delete "revised".

Column 5, line 44, insert --,-- after "member".

Signed and Sealed this

Thirtieth Day of April, 1996

Attest:

BRUCE LEHMAN

Attesting Officer        Commissioner of Patents and Trademarks